(12) United States Patent
Krishnaswamy

(10) Patent No.: US 11,836,058 B2
(45) Date of Patent: Dec. 5, 2023

(54) SYSTEM AND METHOD FOR AUTOMATED SECONDARY OR DISASTER-RECOVERY DATA CENTER SITE FAILOVER

(71) Applicant: JPMorgan Chase Bank, N.A., New York, NY (US)

(72) Inventor: Shankaran Krishnaswamy, Plano, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 5 days.

(21) Appl. No.: 17/649,482

(22) Filed: Jan. 31, 2022

(65) Prior Publication Data
US 2023/0244577 A1 Aug. 3, 2023

(51) Int. Cl.
G06F 11/00 (2006.01)
G06F 11/20 (2006.01)
G06F 16/27 (2019.01)

(52) U.S. Cl.
CPC ...... *G06F 11/2023* (2013.01); *G06F 11/2025* (2013.01); *G06F 11/2069* (2013.01); *G06F 16/27* (2019.01)

(58) Field of Classification Search
CPC .............. G06F 11/2023; G06F 11/2025; G06F 11/2069
See application file for complete search history.

(56) References Cited

U.S. PATENT DOCUMENTS

| 2014/0365811 | A1* | 12/2014 | Veiga | G06F 11/2041 |
| | | | | 714/4.11 |
| 2023/0041089 | A1* | 2/2023 | Zhang | G06F 11/2038 |

OTHER PUBLICATIONS

Rostanski et al., "Evaluation of highly available and fault-tolerant middleware clustered architectures using RabbitMQ", 2014, Proceedings of the 2014 Federated Conference of Computer Science and Information Systems, pp. 879-884 (Year: 2014).*
Alfatafta et al., "Toward a Generic Fault Tolerance Technique for Partial Network Partitioning", Proceedings of the 14th USENIX Symposium on Operating Systems Design and Implementation, Nov. 4-6, 2020, pp. 350-368 (Year: 2020).*

* cited by examiner

*Primary Examiner* — Michael Maskulinski
(74) *Attorney, Agent, or Firm* — GREENBLUM & BERNSTEIN, P.L.C.

(57) ABSTRACT

Automated disaster recovery site failover of a messaging platform is disclosed. A processor establishes a communication link between a first data center site and a second data center site via a communication network. The first data center site includes a first database in an active state and the second data center site includes a second database in a passive state during which data replication flows from the first database to the second database. The processor monitors states of the first database and the second database; detects, in response to monitoring, that the first database has changed its state from the active state to the passive state and that the second database has changed its state from the passive state to the active state; and automatically switches, in response to detecting, the data replication flows during which the data replication flows from the second database to the first database.

18 Claims, 8 Drawing Sheets

SYSTEM AND METHOD FOR AUTOMATED SECONDARY OR DISASTER-RECOVERY DATA CENTER SITE FAILOVER

TECHNICAL FIELD

This disclosure generally relates to application and infrastructure resources, and, more particularly, to methods and apparatuses for implementing an automated secondary site failover module for detecting database states of a primary and a secondary site and automatically switching replication flows.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Applications typically require infrastructure resources such as servers, databases, load balancers, message queues, storages etc. in order to function. Typically, these infrastructure resources need to be provided at the time of application startup. Modern applications may need to access a number of infrastructure resources in order to provide useful functionality. For example, an organization such as JPMorgan and Chase typically runs highly resilient applications. Often, intermittent issues can go undetected leading to dropped transactions. Although conventional monitoring systems may notify the issues, but fail to automatically resolve the issue. For example, application failures due to system faults or application degradation may be detected by monitoring tools but do not have automatic fail-over or self-healing capabilities resulting in customer impacts.

For example, applications utilizing a conventional messaging platform (e.g., Kafka, RabbitMQ, or other similar messaging platform) cluster for their micro services in an active or passive mode may typically mirror the messaging platform topic data from a primary to a secondary data center. However, such conventional messaging platform lacks, among others, automated failover support. For example, although newer version of Apache Kafka added a feature to track timestamps in the Kafka cluster itself and to mirror the same, the direction flip of mirroring is too involved with many settings and additional protections to prevent circular messaging thereby failing to provide an automated failover support during a system failure in a primary data center or a secondary data center.

Thus, there is a need for an advanced tool that can address these conventional shortcomings.

SUMMARY

The present disclosure, through one or more of its various aspects, embodiments, and/or specific features or sub-components, provides, among other features, various systems, servers, devices, methods, media, programs, and platforms for implementing an automated secondary site failover module for detecting database states of a primary and a secondary site and automatically switching replication flows, thereby improving applications' performances and reducing customer impact but the disclosure is not limited thereto.

According to an aspect of the present disclosure, a method for automated disaster recovery site failover of a messaging platform by utilizing one or more processors and one or more memories is disclosed. The method may include: establishing a communication link between a first data center site and a second data center site via a communication network, wherein the first data center site includes a first database in an active state and the second data center site includes a second database in a passive state during which data replication flows from the first database to the second database; monitoring states of the first database and the second database; detecting, in response to monitoring, that the first database has changed its state from the active state to the passive state and that the second database has changed its state from the passive state to the active state; and automatically switching, in response to detecting, the data replication flows during which the data replication flows from the second database to the first database.

According to yet another aspect of the instant disclosure, the active state is a state during which both reading and writing operations are performed and the passive state is a state during which only reading operation is performed.

According to a further aspect of the instant disclosure, the first data center site may include a first messaging platform manager and the second data center site may include a second messaging platform manager, but the disclosure is not limited thereto.

According to an additional aspect of the instant disclosure, during a normal operation mode prior to detecting any change of states of the first database and the second database, the method may further include: maintaining state of the first messaging platform manager in a suspended state; and monitoring the first database for any state change.

According to yet another aspect of the instant disclosure, during the normal operation mode prior to detecting any change of states of the first database and the second database, the method may further include: maintaining state of the second messaging platform manager in an active state; pulling data from first messaging platform topics for replication from the first data center site; and monitoring the second database for any state change.

According to yet another aspect of the instant disclosure, during a disaster recovery operation mode in response to detecting that the first database has changed its state from the active state to the passive state, the method may further include: changing a suspended state of the first messaging platform manager to an active state; pulling data from second messaging platform topics for replication from the second data center site; and monitoring the first database for any state change.

According to a further aspect of the instant disclosure, during the disaster recovery operation mode in response to detecting that the second database has changed its state from the passive state to the active state, the method may further include: changing an active state of the second messaging platform manager to a suspended state; and monitoring the second database for any state change.

According to another aspect of the instant disclosure, a system for automated disaster recovery site failover of a messaging platform is disclosed. The system may include: a processor; and a memory operatively connected to the processor via a communication interface, the memory storing computer readable instructions, when executed, may cause the processor to: establish a communication link between a first data center site and a second data center site via a communication network, wherein the first data center site includes a first database in an active state and the second data center site includes a second database in a passive state during which data replication flows from the first database to the second database; monitor states of the first database and the second database; detect, in response to monitoring, that the first database has changed its state from the active state to the passive state and that the second database has changed its state from the passive state to the active state; and automatically switch, in response to detecting, the data replication flows during which the data replication flows from the second database to the first database.

According to yet another aspect of the instant disclosure, during a normal operation mode prior to detecting any change of states of the first database and the second database, the processor may be further configured to: maintain state of the first messaging platform manager in a suspended state; and monitor the first database for any state change.

According to a further aspect of the instant disclosure, during the normal operation mode prior to detecting any change of states of the first database and the second database, the processor may be further configured to: maintain state of the second messaging platform manager in an active state; pull data from first messaging platform topics for replication from the first data center site; and monitor the second database for any state change.

According to yet another aspect of the instant disclosure, during a disaster recovery operation mode in response to detecting that the first database has changed its state from the active state to the passive state, the processor is further configured to: change a suspended state of the first messaging platform manager to an active state; pull data from second messaging platform topics for replication from the second data center site; and monitor the first database for any state change.

According to a further aspect of the present disclosure, during the disaster recovery operation mode in response to detecting that the second database has changed its state from the passive state to the active state, the processor may be further configured to: change an active state of the second messaging platform manager to a suspended state; and monitor the second database for any state change.

According to yet another aspect of the present disclosure, a non-transitory computer readable medium configured to store instructions for automated disaster recovery site failover of a messaging platform is disclosed. The instructions, when executed, cause a processor to perform the following: establishing a communication link between a first data center site and a second data center site via a communication network, wherein the first data center site includes a first database in an active state and the second data center site includes a second database in a passive state during which data replication flows from the first database to the second database; monitoring states of the first database and the second database; detecting, in response to monitoring, that the first database has changed its state from the active state to the passive state and that the second database has changed its state from the passive state to the active state; and automatically switching, in response to detecting, the data replication flows during which the data replication flows from the second database to the first database.

According to an additional aspect of the instant disclosure, during a normal operation mode prior to detecting any change of states of the first database and the second database, the instructions, when executed, may further cause the processor to perform the following: maintaining state of the first messaging platform manager in a suspended state; and monitoring the first database for any state change.

According to a further aspect of the instant disclosure, during the normal operation mode prior to detecting any change of states of the first database and the second database, the instructions, when executed, may further cause the processor to perform the following: maintaining state of the second messaging platform manager in an active state; pulling data from first messaging platform topics for replication from the first data center site; and monitoring the second database for any state change.

According to yet another aspect of the instant disclosure, during a disaster recovery operation mode in response to detecting that the first database has changed its state from the active state to the passive state, the instructions, when executed, may further cause the processor to perform the following: changing a suspended state of the first messaging platform manager to an active state; pulling data from second messaging platform topics for replication from the second data center site; and monitoring the first database for any state change.

According to yet another aspect of the instant disclosure, during the disaster recovery operation mode in response to detecting that the second database has changed its state from the passive state to the active state, and the instructions, when executed, further cause the processor to perform the following: changing an active state of the second messaging platform manager to a suspended state; and monitoring the second database for any state change.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
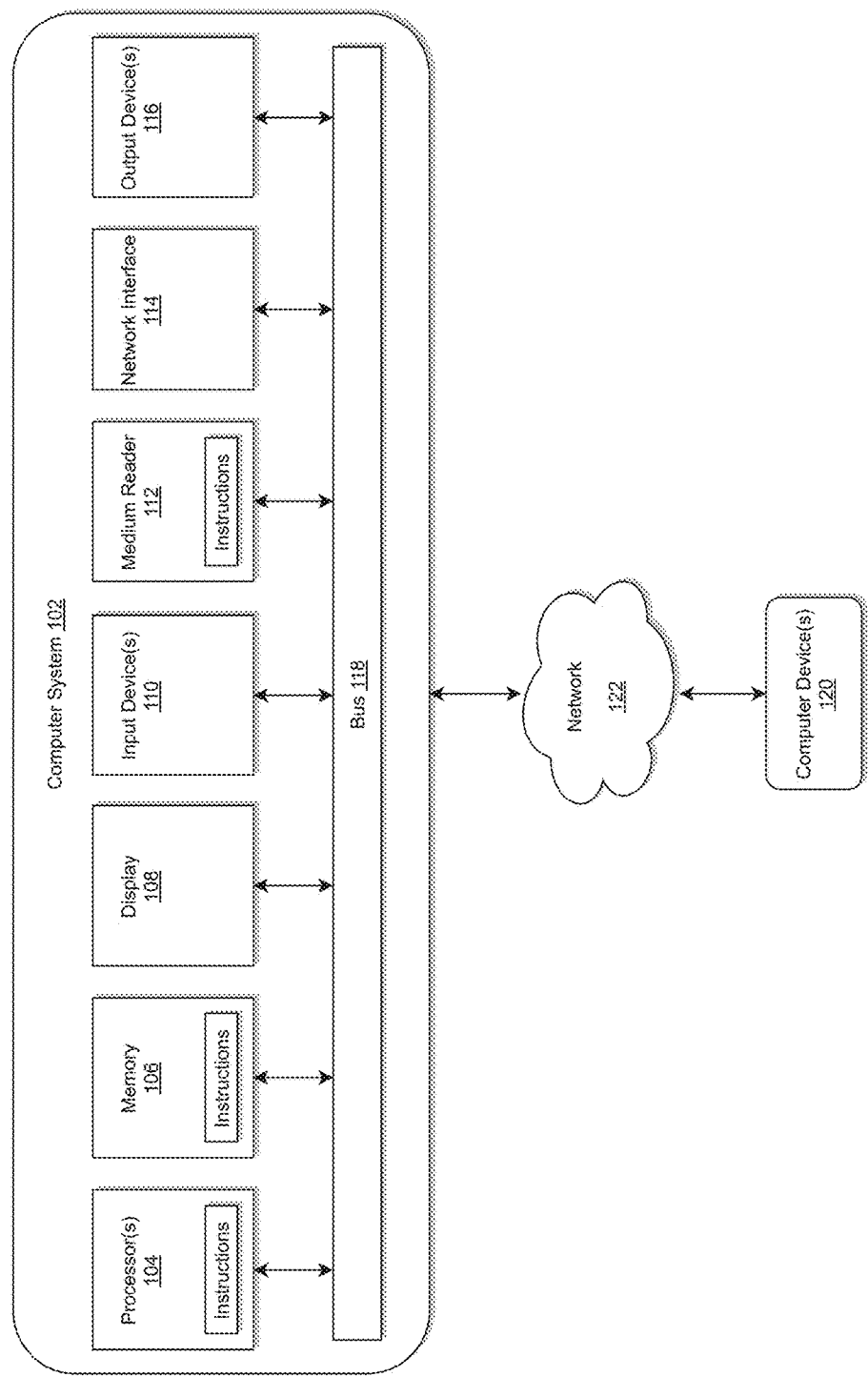
FIG. 1 illustrates a computer system for implementing an automated secondary site failover module for detecting database states of a primary and a secondary site and automatically switching replication flows in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system for use in implementing an automated secondary site failover module for detecting database states of a primary and a secondary site and automatically switching replication flows in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

According to exemplary embodiments, the automated secondary site failover module may be platform and language agnostic that may allow for consistent easy orchestration and passing of data through various components to output a desired result. Since the disclosed process, according to exemplary embodiments, is platform and language agnostic, the automated secondary site failover module may be independently tuned or modified for optimal performance without affecting the configuration or data files. The configuration or data files, according to exemplary embodiments, may be written using JSON, but the disclosure is not limited thereto. For example, the configuration or data files may easily be extended to other readable file formats such as XML, YAML, etc., or any other configuration based languages.

Failover, within the scope of the present disclosure, may mean switching to a redundant or standby computer server, database, data center, system, hardware component or network upon the failure or abnormal termination of the previously active application, server, database, data center, system, hardware component, or network in a computer network, but the disclosure is not limited thereto.

Figure 2:
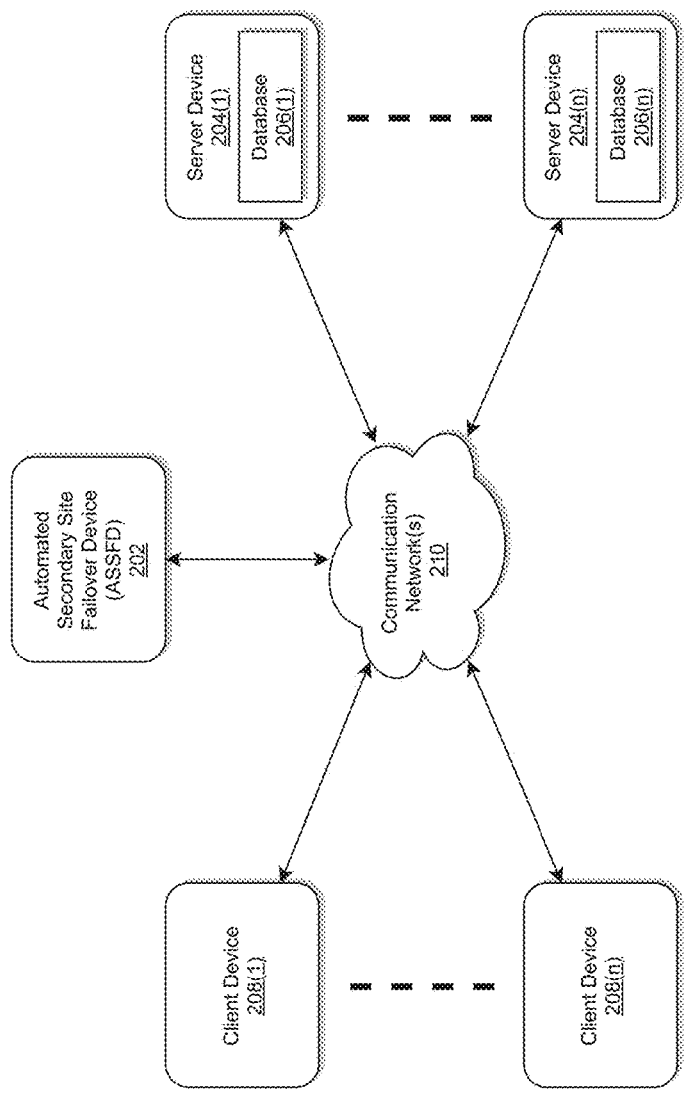
FIG. 2 illustrates an exemplary diagram of a network environment with an automated secondary site failover device in accordance with an exemplary embodiment.

Referring to FIG. 2, a schematic of an exemplary network environment 200 for implementing an automated secondary site failover device (ASSFD) of the instant disclosure is illustrated.

According to exemplary embodiments, the above-described problems associated with conventional messaging platform may be overcome by implementing a ASSFD 202 as illustrated in FIG. 2 that may be configured for detecting database states of a primary and a secondary site and automatically switching replication flows, thereby improving applications' performances and reducing system or customer impact but the disclosure is not limited thereto.

The ASSFD 202 may be the same or similar to the computer system 102 as described with respect to FIG. 1.

The ASSFD 202 may store one or more applications that can include executable instructions that, when executed by the ASSFD 202, cause the ASSFD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the ASSFD 202 itself, may be located in virtual server(s) running in a cloud-based computing environment rather than being tied to one or more specific physical network computing devices. Also, the application(s) may be running in one or more virtual machines (VMs) executing on the ASSFD 202. Additionally, in one or more embodiments of this technology, virtual machine(s) running on the ASSFD 202 may be managed or supervised by a hypervisor.

In the network environment 200 of FIG. 2, the ASSFD 202 is coupled to a plurality of server devices 204(1)-204(n) that hosts a plurality of databases 206(1)-206(n), and also to a plurality of client devices 208(1)-208(n) via communication network(s) 210. A communication interface of the ASSFD 202, such as the network interface 114 of the computer system 102 of FIG. 1, operatively couples and communicates between the ASSFD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the ASSFD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The ASSFD 202 may be a standalone device or integrated with one or more other devices or apparatuses, such as one or more of the server devices 204(1)-204(n), for example. In one particular example, the ASSFD 202 may be hosted by one of the server devices 204(1)-204(n), and other arrangements are also possible. Moreover, one or more of the devices of the ASSFD 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the ASSFD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the ASSFD 202 that may efficiently provide a platform for detecting database states of a primary and a secondary site and automatically switching replication flows, thereby improving applications' performances and reducing customer or system impact but the disclosure is not limited thereto.

The client devices 208(1)-208(n) may run interface applications, such as standard web browsers or standalone client applications, which may provide an interface to communicate with the ASSFD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the ASSFD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the ASSFD 202, the server devices 204(1)-204(n), or the client devices 208(1)-208(n), for example, may be configured to operate as virtual instances on the same physical machine. For example, one or more of the ASSFD 202, the server devices 204(1)-204(n), or the client devices 208(1)-208(n) may operate on the same physical device rather than as separate devices communicating through communication network(s) 210. Additionally, there may be more or fewer ASSFDs 202, server devices 204(1)-204(n), or client devices 208(1)-208(n) than illustrated in FIG. 2. According to exemplary embodiments, the ASSFD 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
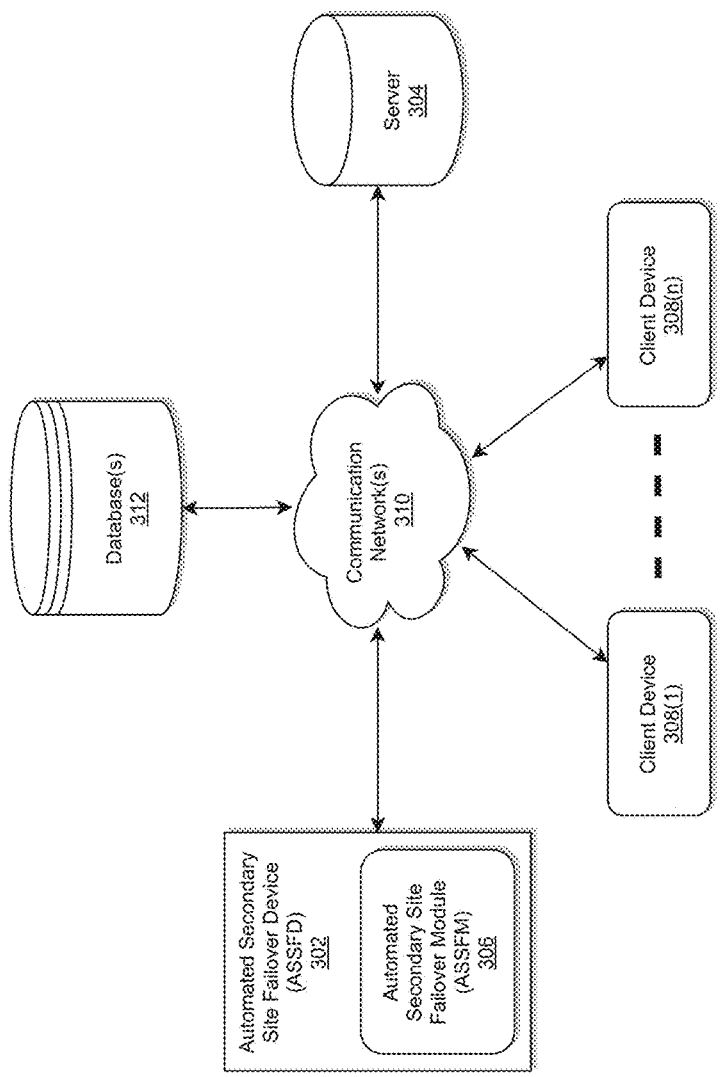
FIG. 3 illustrates a system diagram for implementing an automated secondary site failover device having an automated secondary site failover module in accordance with an exemplary embodiment.

FIG. 3 illustrates a system diagram for implementing an automated secondary site failover device (ASSFD) having an automated secondary site failover module (ASSFM) in accordance with an exemplary embodiment.

As illustrated in FIG. 3, the system 300 may include an ASSFD 302 within which an ASSFM 306 is embedded, a server 304, a database(s) 312, a plurality of client devices 308(1) . . . 308(n), and a communication network 310.

According to exemplary embodiments, the ASSFD 302 including the ASSFM 306 may be connected to the server 304, and the database(s) 312 via the communication network 310. The ASSFD 302 may also be connected to the plurality of client devices 308(1) . . . 308(n) via the communication network 310, but the disclosure is not limited thereto.

According to exemplary embodiment, the ASSFD 302 is described and shown in FIG. 3 as including the ASSFM 306, although it may include other rules, policies, modules, databases, or applications, for example. According to exemplary embodiments, the database(s) 312 may be configured to store ready to use modules written for each API for all environments. Although only one database is illustrated in FIG. 3, the disclosure is not limited thereto. Any number of desired databases may be utilized for use in the disclosed invention herein.

According to exemplary embodiments, the ASSFM 306 may be configured to receive real-time feed of data from the plurality of client devices 308(1) . . . 308(n) via the communication network 310.

As will be described below, the ASSFM 306 may be configured to establish a communication link between a first data center site and a second data center site via the communication network 310, wherein the first data center site includes a first database (i.e., one of the database 312) in an active state and the second data center site includes a second database (i.e., another one of the database 312) in a passive state during which data replication flows from the first database (i.e., one of the database 312) to the second database (i.e., another one of the database 312); monitor states of the first database (i.e., one of the database 312) and the second database (i.e., another one of the database 312); detect, in response to monitoring, that the first database (i.e., one of the database 312) has changed its state from the active state to the passive state and that the second database (i.e., another one of the database 312) has changed its state from the passive state to the active state; and automatically switch, in response to detecting, the data replication flows during which the data replication flows from the second database (i.e., another one of the database 312) to the first database (i.e., one of the database 312), but the disclosure is not limited thereto.

The plurality of client devices 308(1) . . . 308(n) are illustrated as being in communication with the ASSFD 302. In this regard, the plurality of client devices 308(1) . . . 308(n) may be "clients" of the ASSFD 302 and are described herein as such. Nevertheless, it is to be known and understood that the plurality of client devices 308(1) . . . 308(n) need not necessarily be "clients" of the ASSFD 302, or any entity described in association therewith herein. Any additional or alternative relationship may exist between either or both of the plurality of client devices 308(1) . . . 308(n) and the ASSFD 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the ASSFD 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The ASSFD 302 may be the same or similar to the ASSFD 202 as described with respect to FIG. 2, including any features or combination of features described with respect thereto.

Figure 4:
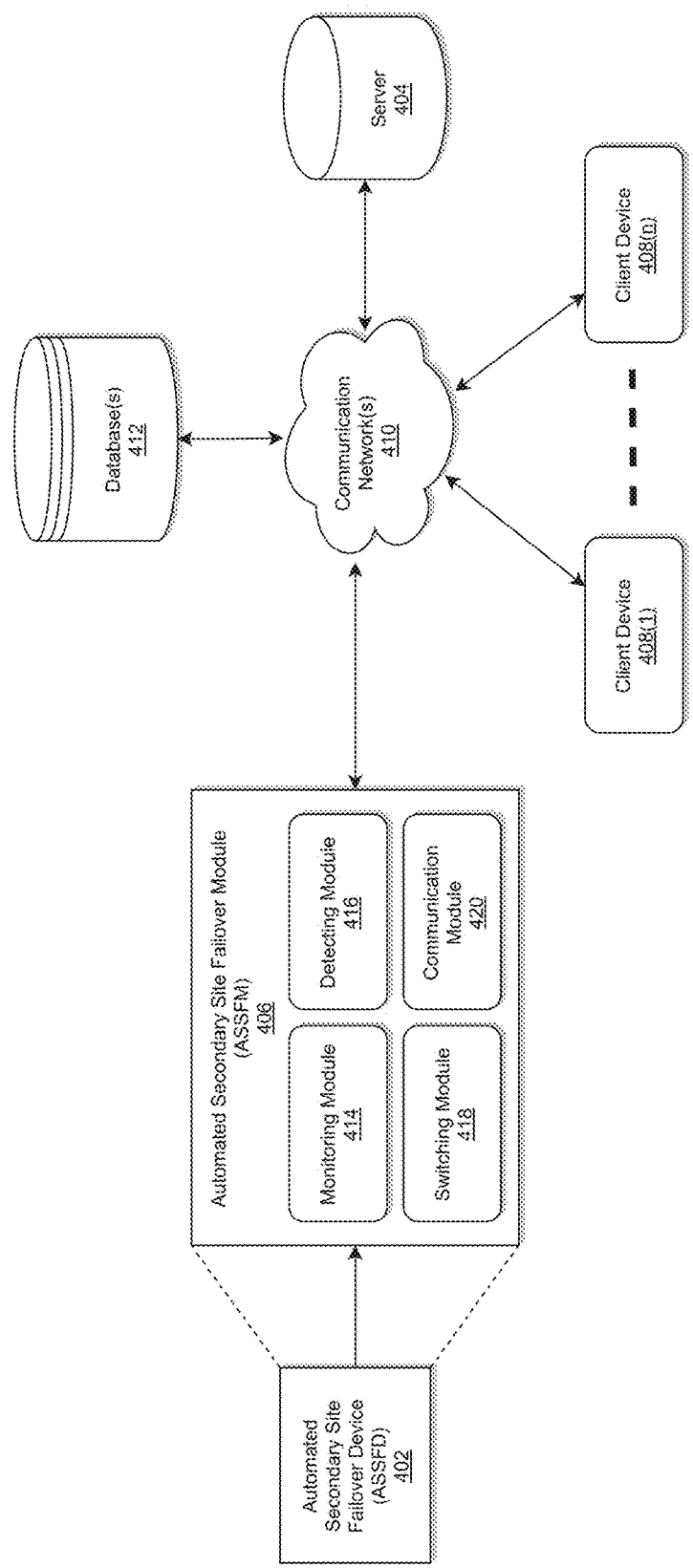
FIG. 4 illustrates a system diagram for implementing an automated secondary site failover module of FIG. 3 in accordance with an exemplary embodiment.

FIG. 4 illustrates a system diagram for implementing an automated secondary site failover module (ASSFM) of FIG. 3 in accordance with an exemplary embodiment.

According to exemplary embodiments, the system 400 may include an automated secondary site failover device (ASSFD) 402 within which an ASSFM 406 is embedded, a server 404, database(s) 412, and a communication network 410.

According to exemplary embodiments, the ASSFD 402 including the ASSFM 406 may be connected to the server 404 and the database(s) 412 via the communication network 410. The ASSFD 402 may also be connected to the plurality of client devices 408(1)-408(n) via the communication network 410, but the disclosure is not limited thereto. The ASSFM 406, the server 404, the plurality of client devices 408(1)-408(n), the database(s) 412, the communication network 410 as illustrated in FIG. 4 may be the same or similar to the ASSFM 306, the server 304, the plurality of client devices 308(1)-308(n), the database(s) 312, the communication network 310, respectively, as illustrated in FIG. 3.

According to exemplary embodiments, as illustrated in FIG. 4, the ASSFM 406 may include a monitoring module 414, a detecting module 416, a switching module 418, and a communication module 420.

According to exemplary embodiments, each of the monitoring module 414, detecting module 416, switching module 418, and the communication module 420 of the ASSFM 406 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

According to exemplary embodiments, each of the monitoring module 414, detecting module 416, switching module 418, and the communication module 420 of the ASSFM 406 may be implemented by microprocessors or similar, and may be programmed using software (e.g., microcode) to perform various functions discussed herein and may optionally be driven by firmware and/or software.

Alternatively, according to exemplary embodiments, each of the monitoring module 414, detecting module 416, switching module 418, and the communication module 420 of the ASSFM 406 may be implemented by dedicated hardware, or as a combination of dedicated hardware to perform some functions and a processor (e.g., one or more programmed microprocessors and associated circuitry) to perform other functions.

According to exemplary embodiments, each of the monitoring module 414, detecting module 416, switching module 418, and the communication module 420 of the ASSFM 406 may be called via corresponding API.

The process may be executed via the communication module 420 and the communication network 410, which may comprise plural networks as described above. For example, in an exemplary embodiment, the various components of the ASSFM 406 may communicate with the server 404, and the database(s) 412 via the communication module 420 and the communication network 410. Of course, these embodiments are merely exemplary and are not limiting or exhaustive.

According to exemplary embodiments, the communication network 410 and the communication module 420 may be configured to establish a link between the database(s) 412, the client devices 408(1)-408(n) and the ASSFM 406.

According to exemplary embodiments, the active state is a state during which both reading and writing operations are performed and the passive state is a state during which only reading operation is performed.

Figure 5:
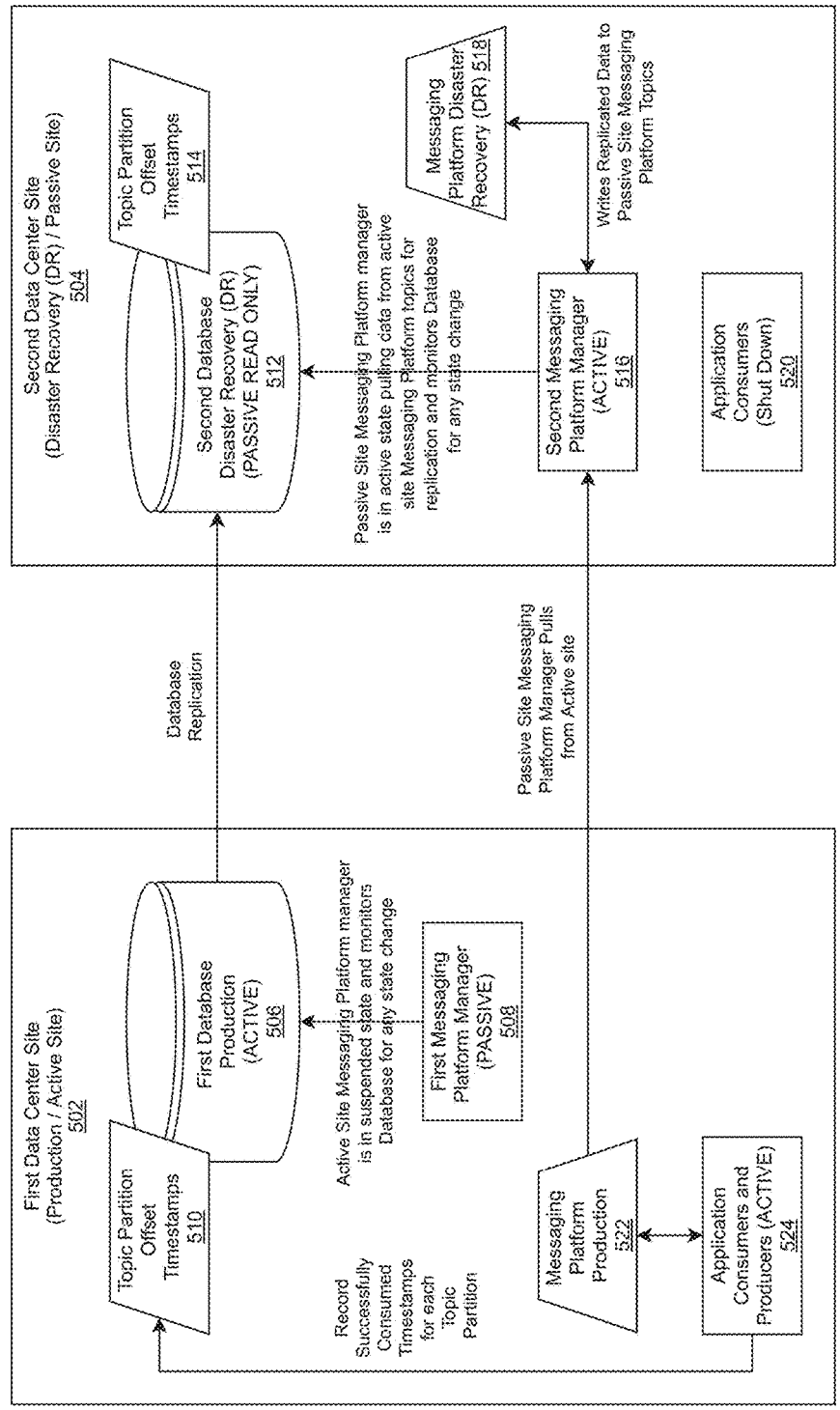
FIG. 5 illustrates an exemplary architecture during a normal operation mode implemented by the automated secondary site failover module of FIG. 4 in accordance with an exemplary embodiment.

FIG. 5 illustrates an exemplary architecture 500 during a normal operation mode implemented by the ASSFM 406 of FIG. 4 in accordance with an exemplary embodiment.

FIG. 5 illustrates a first data center site 502 and a second data center site 504.

According to exemplary embodiments, during normal operation mode, the first data center site 502 may be referred to as a production site or an active site during which application consumers and producers 524 are in active mode. The first data center site 502 may include a first database 506, a first messaging platform manager 508 at a passive mode, and a messaging platform 522 at the production site.

According to exemplary embodiments, during normal operation mode, the second data center 504 may be referred to as a disaster recovery site or a passive site. The second data center 504 may include a second database 512, a second messaging platform manager 516 at an active mode, and a messaging platform 518.

According to exemplary embodiments, during this normal operation mode, flow of database replication is from the first database 506 to the second database 512.

For example, during the normal operation mode, the first messaging platform manager 508 is in a suspended state and monitors the first database 506 for any state change. Topic partition offset timestamps 510 from the application consumers and producers 524 are stored onto the first database 506 and flows to the second database 512 for replication (i.e., topic partition offset timestamps 514). The messaging platform 522 at the production site 502 is in constant communication with the second messaging platform manager 516 which is in an active mode at the second data center site 504 (disaster recovery/passive site) so that the second messaging platform manager 516 can pull data from the production site 502 messaging platform 522. The second messaging platform manager 516 is in an active mode/state, and pulls data from the active site massaging platform topics for replication and monitors the second database 512 for any state change. The second messaging platform manager 516 and the messaging platform 518 at the second data center site 504 (disaster recovery/passive) bi-directionally communicate with each other for writing replicated data to the second disaster recovery/passive site messaging platform topics.

For example, referring to FIGS. 4 and 5, according to exemplary embodiments, the communication module 420 may be configured to establish a communication link between the first data center site 502 and the second data center site 504 via the communication network 410, wherein the first data center site 502 includes a first database 506 in an active state and the second data center site 504 includes a second database 512 in a passive state during which data replication flows from the first database 506 to the second database 512.

According to exemplary embodiments, the monitoring module 414 may be configured to monitor states of the first database 506 and the second database 512. The detecting module 416 may be configured to detect, in response to monitoring, that the first database 506 has changed its state from the active state to the passive state (see, e.g., FIGS. 6 and 7) and that the second database 512 has changed its state from the passive state to the active state (see, e.g., FIGS. 6 and 7). The switching module 418 may be configured to automatically switch, in response to detecting, the data replication flows during which the data replication flows from the second database 512 to the first database 506.

According to exemplary embodiments, during a normal operation mode prior to detecting any change of states of the first database 506 and the second database 512, the ASSFM 406 may be configured to maintain state of the first messaging platform manager 508 in a suspended state; and the monitoring module 414 (may be implemented within the first messaging platform manager 508) constantly monitors the first database 506 for any state change.

According to exemplary embodiments, during the normal operation mode prior to detecting any change of states of the first database 506 and the second database 512, the ASSFM 406 may be configured to maintain state of the second messaging platform manager 516 in an active state; pull data from first messaging platform topics for replication from the first data center site 502 and the monitoring module 414 (may also be implemented within the second messaging platform manager 516) the second database 512 for any state change.

Figure 6:
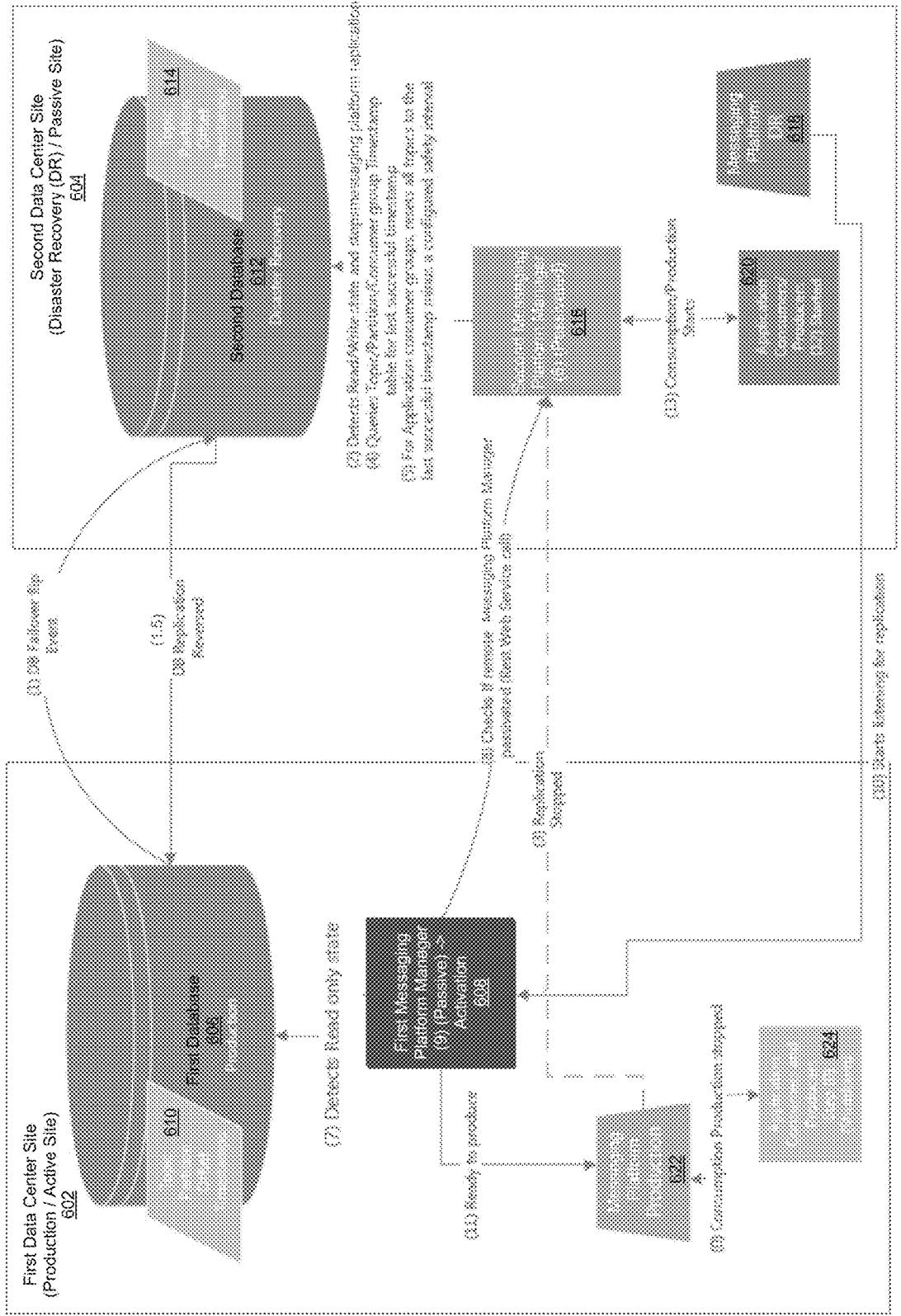
FIG. 6 illustrates an exemplary architecture during a disaster recovery operation mode implemented by the automated secondary site failover module of FIG. 4 in accordance with an exemplary embodiment.
Figure 7:
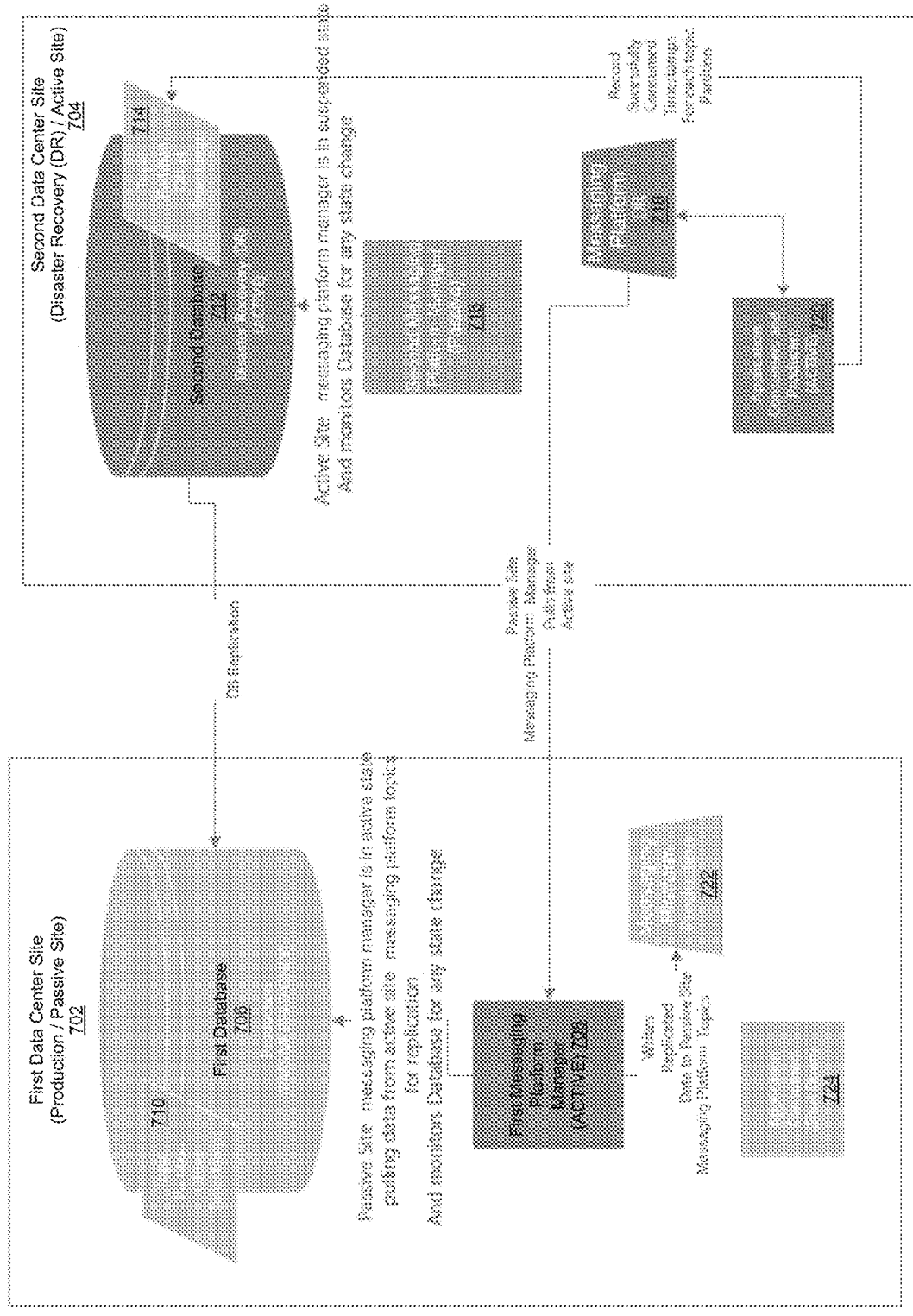
FIG. 7 illustrates another exemplary architecture during a disaster recovery operation mode implemented by the automated secondary site failover module of FIG. 4 in accordance with an exemplary embodiment.

Referring to FIGS. 4, 6, and 7, according to exemplary embodiments, during a disaster recovery operation mode in response to detecting that the first database 606, 706 has changed its state from the active state to the passive state, the ASSFM 406 may be further configured to: change a suspended state of the first messaging platform manager 608, 708 to an active state; pull data from second messaging platform topics for replication from the second data center site 604 which is now in an active state (see, e.g., FIG. 7); and monitor the first database 606, 706 for any state change.

According to exemplary embodiments, during the disaster recovery operation mode in response to detecting that the second database 612 has changed its state from the passive state to the active state, the ASSFM 406 may be further configured to: change an active state of the second messaging platform manager 616, 716 to a suspended state; and monitor the second database 612 for any state change.

For example, FIG. 6 illustrates an exemplary architecture 600 during a disaster recovery operation mode implemented by the ASSFM 406 of FIG. 4 in accordance with an exemplary embodiment. As illustrated in FIG. 6, at sequence 0, consumption production stops (i.e., application consumers and producers 624 stop and shutdown). At sequence 1, database failover flip event occurs and at sequence 2, database replication is reversed (i.e., from the second database 612 to the first database 606). At sequence 3, replication is stopped from the first data center site 602 messaging platform 622 to the second messaging platform manager 616 at the second data center site. At sequence 4, queries topic or partition or consumer group timestamp and generates a table for last successful timestamp. At sequence 5, for application consumer groups, resets all topics to the last successful timestamp minus a configured safety interval. At sequence 6, the second messaging platform manager 616 is passivated. At sequence 7, the first messaging platform manger 608 detects ready only state of the first database 606. At sequence 8, it is checked whether the second messaging platform manger 616 is passivated. At sequence 9, the first messaging platform manger 608 is activated and at sequence 10, starts listening for replication. At sequence 11, the first messaging platform manger 608 sends a messaging to the messaging platform 622 that it is ready to produce. At sequence 12, application consumers/producers 620 to start consumption or production. At sequence 13, consumption/production starts. During the disaster recovery operation mode, data from the messaging platform 618 in the second data center site 604 flows to the first messaging platform manger 608 in the first data center site 602.

As illustrated in FIG. 6, topic partition offset timestamps 610 are stored onto to the first database 606 and topic partition offset timestamps 614 are stored onto the second database 612. According to exemplary embodiments, topic partition offset timestamps 610, 614 are the same.

FIG. 7 illustrates another exemplary architecture 700 during the disaster recovery operation mode of FIG. 6 implemented by the ASSFM 406 of FIG. 4 in accordance with an exemplary embodiment. FIG. 7 illustrates that first data center site 702 now is in passive state and the second data center site now is in active state. Flow of data is now reversed compared to FIG. 5. The first data center site 502, 602, and 702 refer to the same data center site except state is different. Similarly, second data center site 504, 604, and 704 refer to the same data center site except state is different.

For example, FIG. 7 illustrates a first data center site 702 and a second data center site 704. According to exemplary embodiments, during disaster recovery operation mode, the first data center site 702 may be referred to as a passive site during which application consumers and producers 724 are in passive mode (i.e., shutdown). The first data center site 702 may include a first database 706, a first messaging platform manager 708 at an active mode, and a messaging platform 722 at the production site.

According to exemplary embodiments, during disaster recovery operation mode, the second data center 704 may be referred to as an active site. The second data center 704 may include a second database 712, a second messaging platform manager 716 at a passive mode, and a messaging platform 718.

According to exemplary embodiments, during this disaster recovery operation mode, flow of database replication is from the second database 712 to the first database 706.

For example, during the disaster recovery operation mode, the second messaging platform manager 716 is in a suspended state and monitors the second database 712 for any state change. Topic partition offset timestamps 714 from the application consumers and producers 720 are stored onto the second database 712 and flows to the first database 706 for replication (i.e., topic partition offset timestamps 710). The messaging platform 718 at the second data center site 704 is in constant communication with the first messaging platform manager 708 which is in an active state/mode at the first data center site 702 (now passive site) so that the first messaging platform manager 708 can pull data from the second data center site 704 (which is now in active state) messaging platform 718. For example, the first messaging platform manger 708 (now in active state) and pulls data from the second data center site 704 (now in active state) messaging platform topics for replication and monitors the first database 706 for any state change. The second messaging platform manager 716 is in a passive mode/state, and monitors the second database 712 for any state change.

Figure 8:
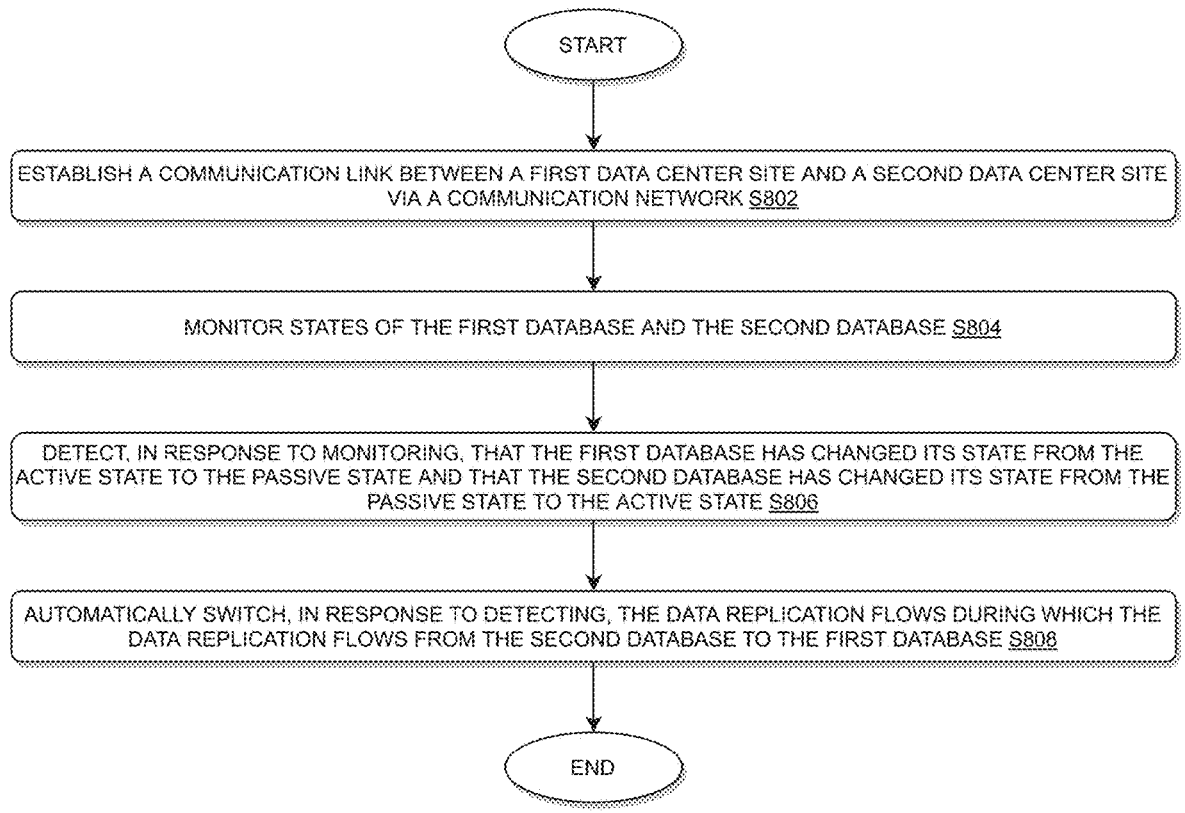
FIG. 8 illustrates a flow chart implemented by the automated secondary site failover module of FIG. 4 for detecting database states of a primary and a secondary site and automatically switching replication flows in accordance with an exemplary embodiment.

FIG. 8 illustrates a flow chart 800 implemented by the ASSFM 406 of FIG. 4 for detecting database states of a primary and a secondary site and automatically switching replication flows in accordance with an exemplary embodiment. It will be appreciated that the illustrated process 800 and associated steps may be performed in a different order, with illustrated steps omitted, with additional steps added, or with a combination of reordered, combined, omitted, or additional steps.

As illustrated in FIG. 8, at step S802, the process 800 may include establishing a communication link between a first data center site and a second data center site via a communication network. The first data center site includes a first database in an active state and a second database in a passive state during which data replication flows from the first database to the second database. According to exemplary embodiments, the first data center site includes a first messaging platform manager and the second data center site includes a second messaging platform manager.

At step S804, the process 800 may include monitoring states of the first database and the second database.

At step S806, the process 800 may include detecting, in response to monitoring, that the first database has changed its state from the active state to the passive state and that the second database has changed its state from the passive state to the active state.

At step S808, the process 800 may include automatically switching, in response to detecting, the data replication flows during which the data replication flows from the second database to the first database.

According to exemplary embodiments, during a normal operation mode prior to detecting any change of states of the first database and the second database, the process 800 may further include: maintaining state of the first messaging platform manager in a suspended state; and monitoring the first database for any state change.

According to exemplary embodiments, during the normal operation mode prior to detecting any change of states of the first database and the second database, the process 800 may further include: maintaining state of the second messaging platform manager in an active state; pulling data from first messaging platform topics for replication from the first data center site; and monitoring the second database for any state change.

According to exemplary embodiments, during the normal operation mode prior to detecting any change of states of the first database and the second database, the process 800 may further include: maintaining state of the second messaging platform manager in an active state; pulling data from first messaging platform topics for replication from the first data center site; and monitoring the second database for any state change.

According to exemplary embodiments, during a disaster recovery operation mode in response to detecting that the first database has changed its state from the active state to the passive state, the process 800 may further include: changing a suspended state of the first messaging platform manager to an active state; pulling data from second messaging platform topics for replication from the second data center site; and monitoring the first database for any state change.

According to exemplary embodiments, during the disaster recovery operation mode in response to detecting that the second database has changed its state from the passive state to the active state, the process 800 may further include: changing an active state of the second messaging platform manager to a suspended state; and monitoring the second database for any state change.

According to exemplary embodiments, the ASSFD 402 may include a memory (e.g., a memory 106 as illustrated in FIG. 1) which may be a non-transitory computer readable medium that may be configured to store instructions for implementing an ASSFM 406 for automated disaster recovery site failover of a messaging platform as disclosed herein. The ASSFD 402 may also include a medium reader (e.g., a medium reader 112 as illustrated in FIG. 1) which may be configured to read any one or more sets of instructions, e.g., software, from any of the memories described herein. The instructions, when executed by a processor embedded within the ASSFM 406 or within the ASSFD 402, may be used to perform one or more of the methods and processes as described herein. In a particular embodiment, the instructions may reside completely, or at least partially, within the memory 106, the medium reader 112, and/or the processor 104 (see FIG. 1) during execution by the ASSFD 402.

According to exemplary embodiments, the instructions, when executed, may cause a processor embedded within the ASSFM 406 or the ASSFD 402 to perform the following: establishing a communication link between a first data center site and a second data center site via a communication network, wherein the first data center site includes a first database in an active state and a second database in a passive state during which data replication flows from the first database to the second database; monitoring states of the first database and the second database; detecting, in response to monitoring, that the first database has changed its state from the active state to the passive state and that the second database has changed its state from the passive state to the active state; and automatically switching, in response to detecting, the data replication flows during which the data replication flows from the second database to the first database. The processor may be the same or similar to the processor 104 as illustrated in FIG. 1 or the processor embedded within ASSFD 202, ASSFD 302, ASSFD 402, and ASSFM 406, 506.

According to exemplary embodiments, during a normal operation mode prior to detecting any change of states of the first database and the second database, the instructions, when executed, may further cause the processor 104 to perform the following: maintaining state of the first messaging platform manager in a suspended state; and monitoring the first database for any state change.

According to exemplary embodiments, during the normal operation mode prior to detecting any change of states of the first database and the second database, the instructions, when executed, may further cause the processor 104 to perform the following: maintaining state of the second messaging platform manager in an active state; pulling data from first messaging platform topics for replication from the first data center site; and monitoring the second database for any state change.

According to exemplary embodiments, during a disaster recovery operation mode in response to detecting that the first database has changed its state from the active state to the passive state, the instructions, when executed, may further cause the processor 104 to perform the following: changing a suspended state of the first messaging platform manager to an active state; pulling data from second messaging platform topics for replication from the second data center site; and monitoring the first database for any state change.

According to exemplary embodiments, during the disaster recovery operation mode in response to detecting that the second database has changed its state from the passive state to the active state, and the instructions, when executed, further cause the processor 104 to perform the following: changing an active state of the second messaging platform manager to a suspended state; and monitoring the second database for any state change.

According to exemplary embodiments as disclosed above in FIGS. 1-8, technical improvements effected by the instant disclosure may include a platform for implementing an automated secondary site failover module for detecting database states of a primary and a secondary site and automatically switching replication flows, thereby improving applications' performances and reducing system or customer impact but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for automated disaster recovery site failover of a messaging platform by utilizing one or more processors and one or more memories, the method comprising:

establishing a communication link between a first data center site and a second data center site via a communication network, wherein the first data center site includes a first database in an active state and the second data center site includes a second database in a passive state during which data replication flows from the first database to the second database;

monitoring states of the first database and the second database;

detecting, in response to monitoring, that the first database has changed its state from the active state to the passive state and that the second database has changed its state from the passive state to the active state; and automatically switching, in response to detecting, the data replication flows during which the data replication flows from the second database to the first database, wherein the active state is a state during which both reading and writing operations are performed and the passive state is a state during which only reading operation is performed.

2. The method according to claim 1, wherein the first data center site includes a first messaging platform manager and the second data center site includes a second messaging platform manager.

3. The method according to claim 2, wherein, during a normal operation mode prior to detecting any change of states of the first database and the second database, the method further comprising:

maintaining state of the first messaging platform manager in a suspended state; and
monitoring the first database for any state change.

4. The method according to claim 3, the method further comprising:

maintaining state of the second messaging platform manager in an active state;
pulling data from first messaging platform topics for replication from the first data center site; and
monitoring the second database for any state change.

5. The method according to claim 2, wherein, during a disaster recovery operation mode in response to detecting that the first database has changed its state from the active state to the passive state, the method further comprising:

changing a suspended state of the first messaging platform manager to an active state;
pulling data from second messaging platform topics for replication from the second data center site; and
monitoring the first database for any state change.

6. The method according to claim 5, wherein, during the disaster recovery operation mode in response to detecting that the second database has changed its state from the passive state to the active state, the method further comprising:

changing an active state of the second messaging platform manager to a suspended state; and
monitoring the second database for any state change.

7. A system for automated disaster recovery site failover of a messaging platform, the system comprising:

a processor; and
a memory operatively connected to the processor via a communication interface, the memory storing computer readable instructions, when executed, causes the processor to:
establish a communication link between a first data center site and a second data center site via a communication network, wherein the first data center site includes a first database in an active state and the second data center site includes a second database in a passive state during which data replication flows from the first database to the second database;
monitor states of the first database and the second database;
detect, in response to monitoring, that the first database has changed its state from the active state to the passive state and that the second database has changed its state from the passive state to the active state; and
automatically switch, in response to detecting, the data replication flows during which the data replication flows from the second database to the first database,
wherein the active state is a state during which both reading and writing operations are performed and the passive state is a state during which only reading operation is performed.

8. The system according to claim 7, wherein the first data center site includes a first messaging platform manager and the second data center site includes a second messaging platform manager.

9. The system according to claim 8, wherein, during a normal operation mode prior to detecting any change of states of the first database and the second database, the processor is further configured to:

maintain state of the first messaging platform manager in a suspended state; and
monitor the first database for any state change.

10. The system according to claim 9, wherein the processor is further configured to:

maintain state of the second messaging platform manager in an active state;
pull data from first messaging platform topics for replication from the first data center site; and
monitor the second database for any state change.

11. The system according to claim 8, wherein, during a disaster recovery operation mode in response to detecting that the first database has changed its state from the active state to the passive state, the processor is further configured to:

change a suspended state of the first messaging platform manager to an active state;
pull data from second messaging platform topics for replication from the second data center site; and
monitor the first database for any state change.

12. The system according to claim 11, wherein, during the disaster recovery operation mode in response to detecting that the second database has changed its state from the passive state to the active state, the processor is further configured to:

change an active state of the second messaging platform manager to a suspended state; and
monitor the second database for any state change.

13. A non-transitory computer readable medium configured to store instructions for automated disaster recovery site failover of a messaging platform, wherein, when executed, the instructions cause a processor to perform the following:

establishing a communication link between a first data center site and a second data center site via a communication network, wherein the first data center site includes a first database in an active state and the second data center site includes a second database in a passive state during which data replication flows from the first database to the second database;
monitoring states of the first database and the second database;
detecting, in response to monitoring, that the first database has changed its state from the active state to the passive state and that the second database has changed its state from the passive state to the active state; and
automatically switching, in response to detecting, the data replication flows during which the data replication flows from the second database to the first database,
wherein the active state is a state during which both reading and writing operations are performed and the passive state is a state during which only reading operation is performed.

14. The non-transitory computer readable medium according to claim 13,
wherein the first data center site includes a first messaging platform manager and the second data center site includes a second messaging platform manager.

15. The non-transitory computer readable medium according to claim 14, wherein, during a normal operation mode prior to detecting any change of states of the first database and the second database, the instructions, when executed, further cause the processor to perform the following:
maintaining state of the first messaging platform manager in a suspended state; and
monitoring the first database for any state change.

16. The non-transitory computer readable medium according to claim 15, wherein the instructions, when executed, further cause the processor to perform the following:
maintaining state of the second messaging platform manager in an active state;
pulling data from first messaging platform topics for replication from the first data center site; and
monitoring the second database for any state change.

17. The non-transitory computer readable medium according to claim 14, wherein, during a disaster recovery operation mode in response to detecting that the first database has changed its state from the active state to the passive state, the instructions, when executed, further cause the processor to perform the following:
changing a suspended state of the first messaging platform manager to an active state;
pulling data from second messaging platform topics for replication from the second data center site; and
monitoring the first database for any state change.

18. The non-transitory computer readable medium according to claim 17, wherein, during the disaster recovery operation mode in response to detecting that the second database has changed its state from the passive state to the active state, and the instructions, when executed, further cause the processor to perform the following:
changing an active state of the second messaging platform manager to a suspended state; and
monitoring the second database for any state change.

* * * * *